Dec. 26, 1961 M. MAMON 3,015,073

MAGNETIC AMPLIFIER

Filed May 26, 1958 2 Sheets-Sheet 1

INVENTOR:
MICHEL MAMON
BY
Karl F. Ross
AGENT

INVENTOR:
MICHEL MAMON
BY
Karl F. Ross
AGENT 3,015,073
MAGNETIC AMPLIFIER
Michel Mamon, 820 West End Ave., New York, N.Y.
Filed May 26, 1958, Ser. No. 737,927
10 Claims. (Cl. 330—8)

My present invention relates to self-balancing electromagnetic amplifiers using saturable reactors with two cores, each with an input winding, a control winding and a load winding, and has for its general object the provision of an improved system for amplifying direct and alternating currents and/or voltages.

This application contains subject matter disclosed in part in my co-pending applications Ser. Nos. 378,980, filed September 8, 1953, now abandoned, 401,553, filed December 31, 1953, 402,070, filed January 4, 1954, and 437,267, filed June 16, 1954. A transistor-controlled magnetic amplifier based on the same principles is described in my co-pending application Ser. No. 385,580, filed October 12, 1953, now Patent No. 2,870,268, issued January 20, 1959.

A feature of this invention is the provision, as part of a driving or primary circuit independent of the load circuit, of a linear or non-linear series resistance having an order of magnitude equal to or greater than that of the A.-C. input impedance of the magnetic amplifier proper as seen by the source of driving voltage. The parameters of this driving circuit are so chosen that more volt-seconds per half-cycle are furnished to the input windings than the magnetic cores can absorb. The cores are consequently driven at each half-cycle from negative to positive full saturation. This oversaturation distorts the sine waves of the input current so that a high ratio of second harmonics is introduced into the system by virtue of the provision of the aforementioned series resistance. With a given terminal voltage at the A.-C. source, proper choice of the magnitude of this resistance will insure that the driving voltage across the primary winding will remain substantially constant, within about ±1%, when the source voltage varies by as much as ±20%.

A more particular object of my invention is to provide an amplifier giving a high D.-C. output at low input, with a power gain of at least 50,000. I accomplish this, in accordance with another feature of this invention, by means of a feedback circuit using a single bridge of commercial-type dry rectifiers. My full-wave rectifier provides the D.-C. output and is at the same time part of the positive and negative feedback circuits. The positive feedback may be so adjusted that in the absence of the negative feedback the magnetic amplifier would be in a state of near oscillation whereby its sensitivity is increased, the amount of negative feedback being sufficient to provide the necessary stability.

Another object of my invention is to provide a magnetic amplifier with a faster time response than has been possible up to now. Thus, through the A.-C. saturation of the cores and the consequent reduction of their effective permeability, the inductance of the control windings is decreased so that my amplifiers have a time response of not more than two to three cycles. Furthermore, by the inclusion of an integrating network in a balancing connection between the driving and output circuits, and by other means to be described hereinafter, a negligible load current under no-signal conditions may be achieved.

The embodiments of my invention described hereinafter incorporate various characteristics disclosed in my above-mentioned co-pending applications. In particular, application Ser. No. 402,070, of which the present application is a continuation-in-part and which is now abandoned, teaches the basic features of a feedback-controlled magnetic amplifier as hereinafter described in detail. A push-pull type amplifier with bipolar output is found in application Ser. No. 437,267, now Patent No. 2,926,300, issued February 23, 1960. The provision of a non-linear input resistance has been described in application Ser. No. 401,553, now also abandoned. An integrating network similar to the one referred to above has been described in my abandoned application Ser. No. 419,730, filed March 30, 1954, now abandoned.

The above and other objects and features of the invention will become more fully apparent from the following detailed description given with reference to the accompanying drawing in which.

Figures 1, 2, 3:
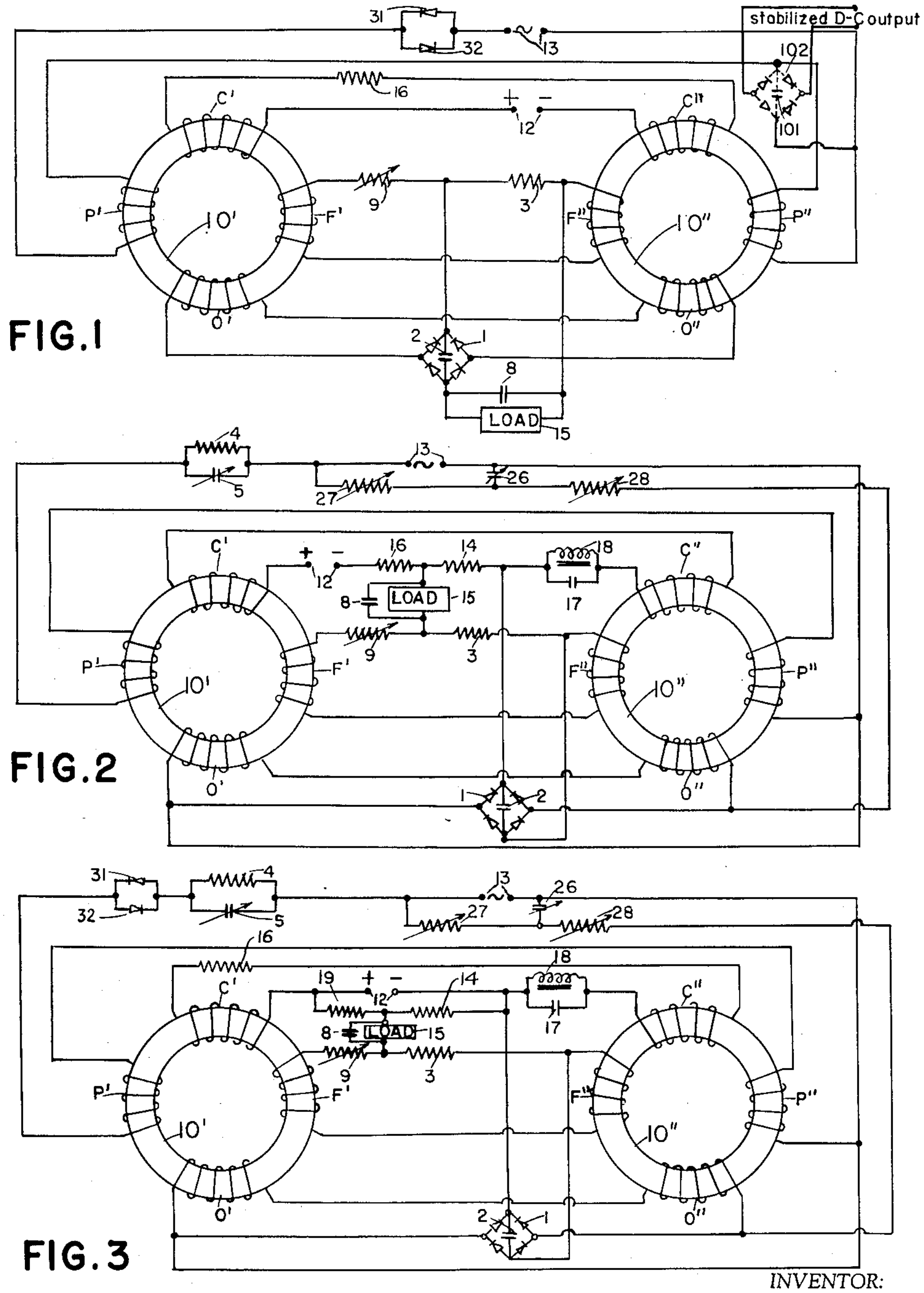
FIG. 1 shows a circuit diagram of a self-balancing low-level magnetic amplifier according to the invention.
FIG. 2 shows a circuit diagram of another amplifier embodiment with a different feedback circuit and an integrating network, suitable for voltage measurement.
FIG. 3 shows a circuit diagram of an embodiment similar to FIG. 2, suitable for current measurement.

Reference will now be made to FIG. 1 for a circuit embodying the principles just discussed. The magnetic amplifier illustrated in this figure comprises a pair of saturable cores 10′, 10″ bearing respective primary windings P′, P″, control windings C′, C″, output windings O′, O″, and feedback windings F′, F″. The windings P′, P″ are connected in series with each other and with alternating-current input terminals 13 in such manner that, during a given half-cycle, the flux produced by them in each core 10′, 10″ will have a predetermined reference direction (assumed to be clockwise for both cores). Windings C′, C″ are connected in series with each other and with direct-current signal terminals 12, as well as a resistor 16, in such manner that for a signal of given polarity the flux produced by these windings will oppose the flux from winding P′ while aiding the flux from winding P″, and vice versa; thus, the relative sense of interconnection of windings C′, C″ is opposite to that of windings P′, P″. Windings O′, O″ are interconnected in the same sense as windings C′, C″, thus again in a sense opposite that of windings P′, P″, and are in series with the alternating-current terminals of a full-wave rectifier bridge 1 having a smoothing condenser 2 connected across its direct-current terminals. A load 15, shunted by a smoothing condenser 8, is connected across the output terminals of bridge 1 in series with a feed-back resistor 3, the latter lying in series with the feedback windings F′, F″ along with an adjustable resistance 9. The sense of interconnection of windings F′, F″ is the same as that of control windings C′, C″ and is so chosen that the voltage across resistor 3 will energize the cores 10′, 10″ in a manner reinforcing the action of the signal voltage at terminals 12, thus providing a regenerative feedback effect. This feedback can be adjusted, with the aid of resistor 9, so that the amplifier is in a near-oscillatory condition.

In series with primary windings P′, P″ and the driving terminals 13 is a resistance of non-linear character, represented by a pair of rectifiers 31, 32 connected in parallel but with opposite polarity. The effect of these rectifiers is to provide a series resistance which varies substantially inversely with the amplitude of the alternating-current driving voltage, in the manner and for the purpose previously set forth.

With the system illustrated in FIG. 1, distinct voltage pulses of opposite polarity occur in the output windings O′, O″. As long as the control windings C′, C″ are not excited, these output pulses are equal and opposite and no current can flow through the load 15. If a signal having the polarity illustrated appears at terminals 12, an output current passes through the rectifier bridge 1, the feedback resistor 3 and the load 15 as well as the windings F′, F″ and resistance 9 in such manner that the flux generated by the latter windings aids that produced by the control windings C′, C″. This results in a positive feedback increasing the ratio of output current to signal voltage. (If the polarity of the signal at terminals 12 were reversed, the feedback would be of a degenerative, or stabilizing, nature.)

In FIG. 2, using the same reference characters as in FIG. 1, I have shown a magnetic amplifier with both positive and negative feedback derived from the same rectifier bridge 1. The load 15 and its parallel condenser 8 are here connected in the shunt arms of a resistance network composed of the resistors 3, 9, 16 and a further feedback resistor 14. The branch 14, 16 of this network is connected in series with control windings C′, C″ and with a parallel-resonant circuit designed to prevent the flow of residual second-harmonic output current in these windings, this circuit comprising a condenser 17 and a choke 18. It will be seen that the load current from bridge 1 traverses the resistor 14 in such sense as to oppose the current flow in the control windings C′, C″ if the signal at terminals 12 has the polarity indicated. A change in signal polarity would again reverse the character of the feedback, resulting in regenerative action of resistor 14 and degenerative action of resistor 3.

Because a perfect balance between the outputs of cores 10′ and 10″ is difficult to achieve even with careful design of the amplifier components, a residual load current will usually flow in the no-signal condition. This condition can be corrected by the provision of an integrating network, consisting of two series resistors 27, 28 and a shunt condenser 26, which is connected between the A.-C. terminals 13 and the input terminals of rectifier bridge 1. This integrating network produces a D.-C. output in response to any unbalance in the currents drawn by primary windings P′ and P″. With proper adjustment of its components 26, 27 and 28, the network will compensate the effects of the unbalanced driving currents upon the output windings O′, O″ and will reduce the load current to zero.

In FIG. 2, furthermore, I have shown the rectifiers 31, 32 of the preceding embodiment replaced by a fixed resistor 4. An adjustable condenser 5, bridged across this resistor, serves as a further means for controlling the wave shape of the primary current and, thereby, minimizing the current flow in output windings O′, O″ and/or control windings C′, C″ when no signal is applied. The condenser 5 should, of course, be small enough so as not to have an undue shunting effect upon the series resistor 4.

Whereas the control circuit of the system of FIG. 2 has a relatively high impedance, so that this system is primarily useful for voltage measurements, I have illustrated in FIG. 3 a further modification in which the dynamic impedance of the control circuit is a small fraction of its direct-current resistance and which therefore lends itself particularly to current measurements. Here the load 15 with its bridging condenser 8 is connected in the shunt arm of a resistance pad composed of feedback resistors 3 and 14, adjustable resistor 9 and a balancing resistor 19, the series arm 14, 19 of the pad being connected across the signal terminals 12. Resistor 16, which limits the flow of current in the control windings C′, C″, is connected in series with these windings and with the parallel-resonant circuit 17, 18 to terminals 12. The amplifier is otherwise identical with that of FIG. 2 except that I have also shown the non-linear resistance combination 31, 32 in series with the condenser-shunted fixed resistor 4.

Figure 4:
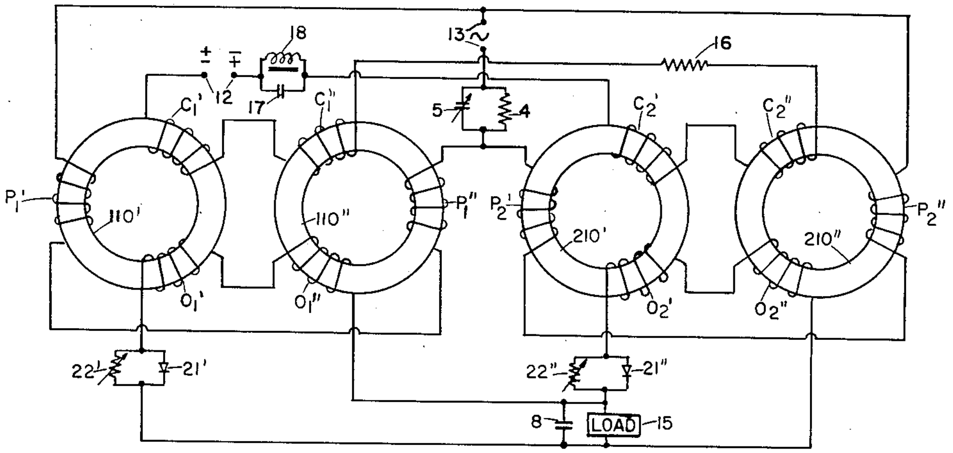
FIG. 4 shows a circuit diagram of a push-pull magnetic amplifier without feedback circuit; and FIGS. *5a*, *5b* and *5c* are graphs serving to explain some of the principal features of my improved amplifier.
Figure 5A:
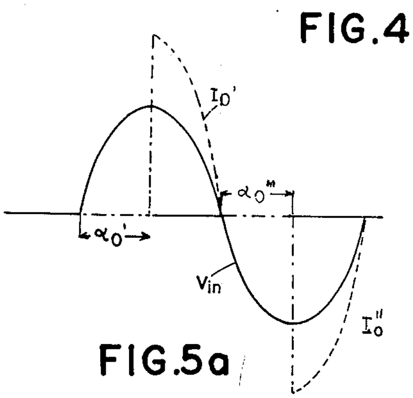
Figure 5B:
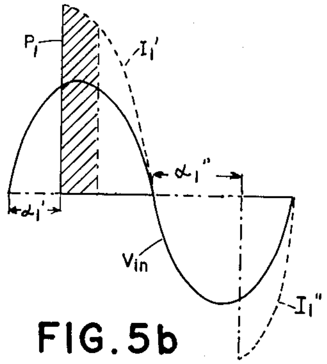
Figure 5C:
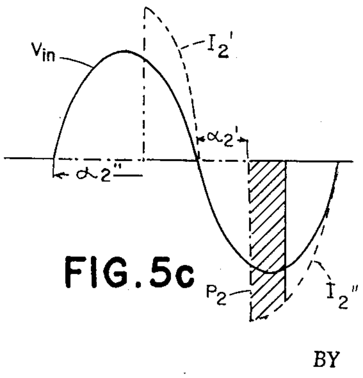

FIG. 4 illustrates a push-pull amplifier according to the invention having four cores 110′, 110″ and 210′, 210″. The primary windings $P_1'$, $P_1''$, the control windings $C_1'$, $C_1''$, and the output windings $O_1'$, $O_1''$ of the first pair of cores 110′, 110″ are identical with those of the cores 10′, 10″ in the preceding embodiments, as are also the primary windings $P_2'$, $P_2''$, the control windings $C_2'$, $C_2''$, and the output windings $O_2'$, $O_2''$ of the second pair of cores 210′, 210″. The primary windings of each core pair are connected in series with each other, and in parallel with the corresponding windings of the other core pair, across the A.-C. terminals 13 by way of series resistor 4, the latter being again shown shunted by the optional condenser 5. All four control windings are connected in series with one another, and with resistor 16 as well as tuned circuit 17, 18, across the signal terminals 12. Output windings $O_1'$, $O_1''$ are connected in series with each other, and with a half-wave rectifier 21′ shunted by an adjustable resistor 22′, across the load 15 which again is shown bridged by the condenser 8, output windings $O_2'$, $O_2''$ being similarly connected across the load in series with a half-wave rectifier 21″ shunted by an adjustable resistor 22″.

Each of the two branches of the circuit shown in FIG. 4 operates in the same manner as the system of FIG. 2, apart from the absence of a feedback winding which could be provided if desired. The rectifiers 21′, 21″ are so poled that the energization of the control windings by the appearance of a signal of given polarity at terminals 12 will induce in the output windings of one pair of cores a preponderance of current flow capable of passing through one of these rectifiers while inducing in the output windings of the other core pair a preponderance of current flow stopped by the second rectifier. This is true because the output pulses produced by a pair of cores in an amplifier according to the invention will be predominantly positive or negative, depending on the polarity of the applied signal. Since the current passing through rectifiers 21′ and 21″ buck each other, the resulting current through load 15 will vary in polarity and magnitude with the applied signal.

Reference is now made to FIGS. *5a–5c* for an analysis of the mode of operation of a magnetic amplifier as shown in the preceding figures. With proper choice of the magnitude of the series resistance of the primary circuit, the current flowing in the windings P′, P″ and, therefore, also the voltages induced in the output windings O′, O″ will be substantially in phase with the driving voltage $V_{in}$ over a large portion of each half cycle. With no signal applied to the control windings C′, C″, the positive and negative half-cycles $I_0'$ and $I_0''$ will be in the form of symmetrical pulses with steep leading edges as illustrated in FIG. *5a*. Under these circumstances the wave shape of the primary current includes no even harmonics and no load current will flow if the cores are exactly balanced. The firing angle $\alpha_0'$ or $\alpha_0''$ of each current pulse is then 90°.

If a control signal of one polarity is applied to the terminals 12, the firing angle $\alpha_1'$ of the positive half-cycles $I_1'$ is reduced while the firing angle $\alpha_1''$ of the negative half-cycles $I_1''$ is increased. The difference in the areas of pulses $I_1'$ and $I_1''$, shown shaded at $P_1$ in FIG. *5b*, is representative of a pulse of one (e.g. positive) polarity appearing in the load circuit. Conversely, a control signal of the other polarity will increase the firing angle $\alpha_2'$ of positive pulse $I_2'$ and reduce the firing angle $\alpha_2''$ of negative current pulse $I_2''$, thereby giving rise to an output pulse of opposite (e.g. negative) polarity as represented by the shaded area $P_2$ in FIG. *5c*.

It may be mentioned that the width of the pulses $P_1$ and $P_2$ in FIGS. *5b* and *5c* has been exaggerated and that in actuality the departure of the firing angles from 90°, in response to the application of a control signal, will amount to only a few electrical degrees. As a result, the R.M.S. value of the primary current varies but slightly with the application of an input signal to terminals 12, at least in the absence of an appreciable load current.

The graphs shown in FIGS. *5a–5c* were obtained by means of a dual-beam oscilloscope arranged to measure both the sinusoidal line voltage and the voltage across the series resistance, the latter being of course representative of the primary current in phase therewith.

If no series resistance of appreciable magnitude were provided in the driving circuit, the current traversing the circuit would not be substantially in phase with the impressed voltage $V_{in}$ over approximately half of each cycle, as illustrated in FIGS. *5a–5c*, but would lag the voltage by a varying angle averaging close to 90°. Under these circumstances no distinct firing angles would exist and the efficiency of the amplifier would be low.

By the use of a wholly or partly non-linear series resistance (as represented by rectifiers 31, 32), whose magnitude decreases at higher voltages, I am able to maintain substantially the same favorable response characteristic while greatly reducing the dissipation in the primary circuit at the peaks of the driving voltage.

For the proper operation of my magnetic amplifier it is necessary to select both the driving voltage at terminals 13 and the magnitude of the series resistance 4 and/or 31, 32 in such manner that a substantially constant R.M.S. voltage is developed across the primary windings P′, P″ with further increases in the applied A.-C. voltage. I have found that these conditions are satisfied if the applied voltage exceeds by at least 20%, but preferably by about 100% or more, the saturation voltage of the amplifier, provided that at the same time the effective series resistance is of the order of ten or more times the input impedance of the amplifier primary windings.

In a specific example, the cores of the amplifier were gapless toroidal structures of square-loop material available under the designation Hy-Mu 80, with an outer diameter of 38 mm., an inner diameter of 28 mm. and a thickness of 13 mm.; each of the primary windings consisted of 500 turns of No. 28 copper wire, each output winding consisted of 1,000 turns of such wire and each control and feedback winding had 100 turns. This amplifier saturated at approximately 15 v. driving voltage and, when connected to an A.-C. line of 30 v. or more, exhibited an effective A.-C. impedance of the same order of magnitude as the associated series resistance, the D.-C. resistance of its primary windings being about 10 ohms. With different series resistance R, the output voltage $V_0$ of the amplifier under no-signal conditions, the output voltage $V_{out}$ in response to a D.-C. signal input of two millivolts, and the voltage $V_R$ developed across the series resistance had the following values for varying line voltages $V_{in}$:

| R (ohms) | $V_{in}$ (volts) | $V_R$ (volts) | $V_{out}$ (volts) | $V_0$ (volts) |
|---|---|---|---|---|
| 200 | 30 | 15 | 4 | 0.05 |
| 300 | 34 | 18 | 1.5 | 0.05 |
| 500 | 34 | 18 | 1.2 | 0.05 |
| 200 | 18 | 4 | 0.5 | 0.4 |
| 300 | 18 | 3.5 | 0.5 | 0.4 |
| 500 | 18 | 3.2 | 0.5 | 0.4 |

From the above table it will be seen that the voltage developed across the primary windings, computed as the difference between line voltage $V_{in}$ and resistor voltage $V_R$, remains very close to the aforementioned value of 15 volts under widely varying operating conditions. It will be also apparent that the signal-to-noise ratio $V_{out}/V_0$ is considerably better with higher voltages but that, at least for this particular amplifier, more favorable ratios are obtained if the series resistor is not too large. In the absence of the series resistor, or with the latter reduced to a magnitude of the order of the 18-ohm amplifier input impedance, it would, of course, have been necessary to limit the line voltage to values considerably below 18 volts in order to avoid the flow of objectionably large primary currents, with a consequent reduction of the signal-to-noise ratio below the value of 1.25 encountered under the operating conditions represented by the last three lines of the above table. The measured R.M.S. values of $V_{in}$ and $V_R$ are substantially independent of the presence or absence of an input signal, in view of the near-constancy of the primary current.

As will be apparent from the preceding description, the voltage developed across the primary windings P′, P″ of my improved amplifier remains substantially constant in the face of large variations in line voltage. Thus, the voltage across these windings, or either of them, can be rectified and utilized as a stabilized direct current recovered through an optional D.-C. output circuit as indicated at 101, 102 in FIG. 1; a similar connection may, of course, also be made in any of the other embodiments disclosed hereinabove.

I claim:

1. A magnetic amplifier comprising a first and a second saturable core, a source of alternating driving voltage, a first and a second primary winding on said first and said second core, respectively, said primary windings being connected in series with each other across said source, said source having an output of an amplitude sufficient to saturate said cores over a substantial portion of each cycle, a first and a second control winding on said first and said second core, respectively, a source of signal voltage, said control windings being connected in series with each other across the last-mentioned source, a load circuit including a first and a second output winding on said first and said second core, respectively, said output windings being connected in series with each other, the sense of interconnection of said primary windings being opposite to that of said control and output windings, and resistance means connected in series with said source of driving voltage and with said primary windings, the magnitude of said resistance means being of the order of that of the alternating-current impedance of said primary windings upon said driving voltage assuming a value of substantially twice the saturation voltage of said primary windings.

2. A magnetic amplifier according to claim 1 wherein the magnitude of said resistance means exceeds that of the D.-C. resistance of said primary windings by at least a factor of ten.

3. A magnetic amplifier according to claim 1 wherein said resistance means includes a non-linear resistance.

4. A magnetic amplifier according to claim 3 wherein said non-linear resistance comprises a pair of rectifiers of opposite polarity connected in parallel with each other.

5. A magnetic amplifier comprising two pairs of saturable cores each including a first and a second core, a source of alternating driving voltage, a first and a second primary winding on said first and said second core of each pair, respectively, said primary windings being connected in series with each other across said source, said source having an output of an amplitude sufficient to saturate said cores over a substantial portion of each cycle, a first and a second control winding on said first and said second core of each pair, respectively, a source of signal voltage, said control windings being connected in series with each other across the last-mentioned source, a first and a second output winding on said first and said second core of each pair, respectively, said output windings being connected in series with each other in the same sense as said control windings and in a sense opposite to that of said primary windings, a load bridged across the output windings of each pair of cores, rectifier means in series with the output windings of each pair of cores poled to energize said load differentially from the outputs of said pairs of cores, and resistance means connected in series with said source of driving voltage and said primary windings, the magnitude of said resistance means being of the order of that of the alternating-current impedance of said primary windings upon said driving voltage assuming a value of substantially twice the saturation voltage of said primary windings.

6. A magnetic amplifier comprising a first and a second saturable core, a pair of input terminals adapted to be connected to a source of alternating driving voltage, a first and a second primary winding on said first and said second core, respectively, a primary circuit connecting said primary windings in series with each other across said input terminals, a first and a second control winding on said first and said second core, respectively, a pair of control terminals adapted to be connected to a source of signal voltage, a control circuit connecting said control windings in series with each other across said control terminals, a first and a second feedback winding on said first and said second core, respectively, a feedback circuit serially interconnecting said feedback windings, a pair of load terminals respectively connected to a point on said control circuit intermediate said control windings and to a point on said feedback circuit intermediate said feedback windings, a rectifier bridge having its output connected across said load terminals via portions of said control and feedback circuits, a first and a second output winding on said first and said second core, respectively, and an output circuit connecting said output windings in series with each other across the input of said bridge, the sense of interconnection of said primary windings being opposite to that of said control, feedback and output windings.

7. A magnetic amplifier according to claim 6, further comprising capacitance means connected across said load terminals.

8. A magnetic amplifier comprising a first and a second saturable core, a pair of input terminals adapted to be connected to a source of alternating driving voltage, a first and a second primary winding on said first and said second core, respectively, a primary circuit connecting said primary windings in series with each other across said input terminals, a first and a second control winding on said first and said second core, respectively, a pair of control terminals adapted to be connected to a source of signal voltage, a control circuit connecting said control windings in series with each other across said control terminals, a first and a second feedback winding on said first and said second core, respectively, a feedback circuit serially interconnecting said feedback windings, a pair of load terminals respectively connected to a point on said control circuit intermediate said control windings and to a point on said feedback circuit intermediate said feedback windings, a rectifier bridge having its output connected across said load terminals via portions of said control and feedback circuits, a first and a second output winding on said first and said second core, respectively, an output circuit connecting said output windings in series with each other across the input of said bridge, the sense of interconnection of said primary windings being opposite to that of said control, feedback and output windings, and an integrating network having its input connected across said input terminals and its output connected across the input of said bridge.

9. A magnetic amplifier comprising a first and a second saturable core, a pair of input terminals adapted to be connected to a source of alternating driving voltage, a first and a second primary winding on said first and said second core, a respectively, a primary circuit connecting said primary windings in series with each other across said input terminals, a first and a second control winding on said first and said second core, respectively, a pair of control terminals adapted to be connected to a source of direct-current signal voltage, a control circuit including a feedback resistance connecting said control windings in series with each other across said control terminals, a first and a second feedback winding on said first and said second core, respectively, a feedback circuit serially interconnecting said feedback windings, a first and a second load terminal respectively connected to a point on said control circuit intermediate said control windings and to a point on said feedback circuit intermediate said feedback windings, a rectifier bridge having its output connected across said feedback resistance in series with said load terminals and with part of said feedback circuit with a polarity opposing said signal voltage, a first and a second output winding on said first and said second core, respectively, and an output circuit connecting said output windings in series with each other across the input of said bridge, the sense of interconnection of said primary windings being opposite to that of said control, feedback and output windings.

10. A magnetic amplifier comprising a first and a second saturable core, a pair of input terminals adapted to be connected to a source of alternating driving voltage, a first and a second primary winding on said first and said second core, respectively, a primary circuit connecting said primary windings in series with each other across said input terminals, a first and a second control winding on said first and said second core, respectively, a pair of control terminals adapted to be connected to a source of direct-current signal voltage, a control circuit including a first resistance connecting said control windings in series with each other across said control terminals, a first and a second feedback winding on said first and said second core, respectively, a feedback circuit including a second resistance serially interconnecting said feedback windings, a first and a second load terminal respectively connected to a point on said control circuit intermediate said control windings and to a point on said feedback circuit intermediate said feedback windings, a rectifier bridge having its output connected across said first resistance in series with said load terminals and with said second resistance with a polarity opposing said signal voltage, a first and a second output winding on said first and said second core, respectively, an output circuit connecting said output windings in series with each other across the input of said bridge, the sense of interconnection of said primary windings being opposite to that of said control, feedback and output windings, the magnitude of said second resistance being such as to place the amplifier in a near-oscillatory state in the absence of said first resistance.

References Cited in the file of this patent

UNITED STATES PATENTS

| | | |
|---|---|---|
| Re. 24,068 | Geyger | Oct. 4, 1955 |
| 2,164,383 | Burton | July 4, 1939 |
| 2,284,444 | Peterson | May 26, 1942 |
| 2,338,079 | Huge | Dec. 28, 1943 |
| 2,388,070 | Middel | Oct. 30, 1945 |
| 2,725,515 | Horton | Nov. 29, 1955 |
| 2,764,725 | Buie | Sept. 25, 1956 |
| 2,770,769 | Seegmiller | Nov. 13, 1956 |
| 2,809,353 | Brown | Oct. 8, 1957 |
| 2,845,590 | Collins | July 29, 1958 |